United States Patent Office 3,305,314
Patented Feb. 21, 1967

3,305,314
PURIFICATION PROCESS
Max O. Freeland, Kirksville, Mo., and Peter R. Johnston, Corpus Christi, Tex., assignors, by mesne assignments, to Pittsburgh Plate Glass Company
No Drawing. Filed July 7, 1958, Ser. No. 746,677
3 Claims. (Cl. 23—207)

This invention relates to a novel method of purifying hydrogen peroxide. It is known to produce hydrogen peroxide by oxidation of organic compounds. In one such typical process, an alkylated anthraquinone, such as 2-ethyl anthraquinone, is reacted with hydrogen in the presence of a catalyst, such as metallic palladium or nickel, to produce the corresponding quinol. The resulting quinol then is reacted with elemental oxygen to produce hydrogen peroxide and also to regenerate the quinone, and the hydrogen peroxide-anthraquinone mixture thus obtained is extracted with water in order to recover the hydrogen peroxide.

This process commonly is conducted using the anthraquinone or like organic compound in a solvent. The solvent comprises a mixture of two solvents, one of which has the ability to dissolve the anthraquinone and the other of which has the ability to dissolve the hydrogenated derivative thereof, i.e., the quinol. Some typical solvents which are used include mixtures of various hydrocarbons, such as xylene, benzene, toluene, alkylated benzenes such as ethyl benzene, and the like, mixed with an alcohol, ketone or an ester, such as cyclohexanol, methyl cyclohexylacetate, normal alcohol, and the like. Typical patents describing this method of producing hydrogen peroxide include the following: U.S. Patents Nos. 2,158,525, 2,178,640, 2,215,883, 2,657,980, 2,668,753, 2,673,140, and 2,739,042.

In the practice of this process, the hydrogen peroxide is obtained as an aqueous solution which may be relatively dilute, and the solution is distilled to remove impurities and/or to concentrate the solution. The product after distillation contains a substantial amount, usually in the range of about 0.1 to 0.5 gram per liter, of carbon which is present in the form of carbonaceous soluble impurities of unknown chemical composition. The removal of this carbon from the hydrogen peroxide is quite difficult. This is particularly true since at least a portion of the carbon boils in approximately the same range as the hydrogen peroxide and therefore distills over with the hydrogen peroxide.

According to the present invention, it has been found that the dissolved carbon impurity present in hydrogen peroxide of the above type may be substantially reduced by contacting the hydrogen peroxide containing such impurity with an anion exchange resin in the form of the hydroxide or a salt of an acid which is weaker than acetic acid.

It also has been found that the time of contact of the hydrogen peroxide solution with the resin should be short, i.e., below 5 minutes and preferably below 1 minute, in order to minimize decomposition of the hydrogen peroxide. Thus, the resin promotes such decomposition. However, it has been found, according to this invention, that the rate of decomposition initially is slow, increasing with increasing time of contact, and that if the treatment with the anion exchange resin is sufficiently rapid, the degree of decomposition is small.

The resins especially suitable for these purposes are the strongly basic anion exchange resins which contain quaternary ammonium groups as their active groups. Some of these resins are prepared by amination of chloromethylated stryene-divinyl benzene polymers. Those in which a lower alkyl amine, such as trimethyl amine, is used in the amination are preferred because of their superior resistance to oxidation. Also used are the resins obtained using an alkylolamine, such as dimethyl ethanol amine, in the amination.

Especially advantageous results are obtained when the resin is in the form of the carbonate or bicarbonate since, with these materials, there is little or no difficulty in removing highly alkaline impurities, and the resin appears to have less tendency to cause decomposition of the hydrogen peroxide.

Such a resin has a substantial portion of anion active groups tied up with carbonate radicals either in the form of the so-called "neutral" salts containing carbonate ($=CO_3$) radicals or in the form of the bicarbonate salt containing the radical ($—HCO_3$). As herein contemplated, whenever the resin is stated to be in the carbonate form, it includes both the normal carbonate and the bicarbonate.

The anion resins as now commercially supplied normally are in the form of the chloride or the hydroxide. The hydroxide form can be used as such after washing with water, preferably until the pH of the wash water has fallen to below 10. The chloride form must be converted to a salt of a weak acid or the hydroxide.

Conveniently, the hydroxide or chloride may be converted to a salt of weak acid by contact with an aqueous solution of such acid or a water soluble alkali metal salt thereof. Thus, the carbonate form may be generated by washing the resin with an aqueous solution of sodium carbonate or sodium bicarbonate. Other forms may be obtained by washing the resin with an aqueous solution of the corresponding alkali metal salt, such as trisodium orthophosphate, sodium stannate, sodium tetraborate, sodium hexametaphosphate or the like.

Thereafter, the resin is washed with water to remove excess alkali and to reduce the pH of the product when dispersed in water, as described above, or the wash water therefrom to below about 10. Following this, a porous bed of the washed resin is established and the hydrogen peroxide to be purified is passed through the bed as rapidly as possible.

Further hydrogen peroxide is passed through the bed until the ability of the resin to remove carbon has been substantially decreased. Thereafter, the resin is reactivated. This reactivation can be effected by treating with an aqueous solution of the hydroxide, salt, or other compound required to supply the desired anion to the resin. Thus, when the hydroxide form of the resin is used, the resin to be reactivated is washed with aqueous sodium hydroxide or like alkali metal hydroxide. Of course, where a salt form of the resin is desired, the spent resin is washed with an aqueous solution of the corresponding alkali metal salt of an acid weaker than acetic acid, such as sodium carbonate, sodium bicarbonate, trisodium phosphate, sodium stannate, etc., or the corresponding acids themselves (carbonic acid, sodium bicarbonate, disodium acid phosphate, and the like). It is then washed to remove alkali, and then is fit for reuse in treatment of further amounts of hydrogen peroxide.

Periodically, the resin is washed with an acid which is at least as strong as acetic acid. Preferably, the resin is washed or contacted with a strong acid, such as hydrochloric acid, nitric acid, sulphuric acid or like inorganic acid having a dissociation constant for the first hydrogen larger than $1 \times 10^{-3}$. However, weaker acids, such as acetic acid or the like, may be used.

This washing is desirable since otherwise the rate of hydrogen peroxide decomposition caused by the resin increases. It normally is done after the resin has been regenerated several times, for example, 5 to 20 times. Usually, the spent resin is so washed, just before a normal regeneration, with sodium carbonate, sodium hydroxide or other salt or hydroxide normally used to regenerate the anion exchange properties of the resin.

Where the resin bed is large, extreme care must be taken to avoid long contact of the bed with the hydrogen peroxide. Thus, if for any reason flow of the hydrogen peroxide through the bed is stopped, the bed must be promptly washed with water to remove retained hydrogen peroxide. Otherwise, a dangerous temperature rise in the bed may ensue.

The following examples are illustrative:

EXAMPLE I

A one-inch diameter column with a fritted glass disc at the bottom was used in the experiment. Twenty-five grams of resin was placed in this column, thus producing a bed 4 inches deep. The chloride form of a resin known as "IRA-400," which is a quaternary ammonium type of anion exchange resin produced by Rohm & Haas Company, was used. The chloride form was converted into the carbonate form by passing 200 milliliters of 1-normal sodium carbonate aqueous solution through the resin bed. The resin was then rinsed with one liter of pure water in order to remove excess alkali and reduce the pH of the resin to about 8.

About 350 milliliters of hydrogen peroxide produced by the above described organic process, in which methyl cyclohexylacetate and an alkyl benzene were used as solvents, was subjected to treatment. This solution contained 50 percent by weight of hydrogen peroxide. The initial carbon content of the solution was 0.2 gram per liter. The solution was poured on the top of the bed and drawn through the bed by suction. Thus, the period of contact of the solution with the resin was a matter of only a few seconds. The temperature of the solution was maintained at 25° C. Upon removal of the hydrogen peroxide solution from the bed, it was found to contain only 0.084 gram of carbon per liter of solution. No appreciable decomposition of hydrogen peroxide was observed.

In a second experiment, the resin used was in the bicarbonate form, having been produced as described above using 1-normal sodium bicarbonate solution rather than sodium carbonate solution. The carbon content in the hydrogen peroxide solution produced by this treatment was 0.088 gram per liter.

EXAMPLE II

A bed of Amberlite IRA-400 was placed in a one-inch glass column as in Example I and converted to the carbonate form using 1-normal sodium carbonate solution as in Example I. Five liters of hydrogen peroxide solution containing 50 percent hydrogen peroxide and about 0.2 gram per liter of carbon was passed through the bed. Thereafter 5 grams of the resulting resin was placed in a column having an inside diameter of 7/16 inch, thus producing a bed 4 inches deep. The bed was treated by passing therethrough 40 milliliters of 1-normal sodium carbonate and rinsing with 100 milliliters of pure water. Thereafter, 500 milliliters of the hydrogen peroxide solution described above was passed through the bed, contact time in the bed being only a matter of 5 to 10 seconds. In each case, the hydrogen peroxide solution thus obtained was found to contain less than 0.1 gram of carbon per liter of solution.

EXAMPLE III

Ten grams of the Amberlite IRA-400 in the chloride form was placed in a column ½ inch in diameter to produce a bed about 10 inches deep. Eighty milliliters of one molar aqueous solution hydroxide solution was passed through the bed. The bed was then rinsed with 100 milliliter portions of pure water until the pH of the effluent fell to 8.5.

Hydrogen peroxide produced as described in Example I and containing 0.28 gram of carbon per liter was passed through the treated bed and the hydrogen peroxide withdrawn from the bed contained only 0.12 gram of carbon per liter.

The above process may be continued until the resin is spent, and the resin reactivated for reuse by treatment with sodium hydroxide, as described above.

While the above examples refer to Amberlite IRA-400, this is not the only resin which may be used. All of the anion exchange resins, particularly the strongly basic resins, may be used in the same way.

EXAMPLE IV

Hydrogen peroxide solution of the type mentioned in Example I was used in this test. Two grams of Amberlite IRA-400 was placed in a ½-inch inside diameter glass column, and 16 milliliters of one molar sodium carbonate aqueous solution was passed through the resulting resin bed. Then, 80 milliliters of water was passed through the bed and, finally, 200 milliliters of the hydrogen peroxide was passed through the bed.

This cycle was repeated 100 times. At the beginning of every tenth cycle, 16 milliliters of one normal aqueous HCl solution was passed through the bed.

The time of contact of the hydrogen peroxide with the bed in each cycle was less than 30 seconds. No deterioration in the ability of the resin to remove carbon and no increase in the rate of decomposition of hydrogen peroxide took place.

In general, at least about 0.001 pound of resin is required per pound of hydrogen peroxide for each cycle. On a large scale, the following schedule is suitable:

| | |
|---|---|
| Pounds of resin per pound of 50% hydrogen peroxide treated per cycle | 0.013 |
| Carbon in feed _____grams per liter | 0.25 |
| Carbon in effluent _____do | 0.15 |
| Retention time in bed (40% voids) ____seconds | 30 |

*Steps in each Cycle of Reactivation of Resin:*

(A) FOR EACH 9 CYCLES (1) Displace hydrogen peroxide in bed by washing with 20 gallons of demineralized water per pound of resin.
(2) Regenerate bed with one molar aqueous sodium carbonate solution using 0.13 pound of $Na_2CO_3$ per pound of resin.
(3) Rinse resin bed with demineralized water to pH 7.5 using 10 gallons of water per pound of resin.
(4) Bed is now ready for treatment of hydrogen peroxide.

(B) EVERY TENTH CYCLE (1) Displace hydrogen peroxide with demineralized water (20 gallons per pound of resin).
(2) Introduce aqueous solution containing 3.65% by weight of HCl into bed using 0.125 gallon of solution per pound of resin.
(3) Wash bed with deionized water (12.5 gallons per pound of resin).
(4) Bed is ready for treatment of hydrogen peroxide.

Although the present invention has been described with reference to the specific details of certain embodiments of the invention, it is not intended that such details shall be regarded as limitations upon the scope of the invention except insofar as included in the accompanying claims.

What is claimed:

1. A method of removing carbonaceous impurity from aqueous hydrogen peroxide solution containing such impurity, said solution having been produced by continuously reducing an anthraquinone, oxidizing said reduced anthraquinone to form an anthraquinone and hydrogen peroxide, contacting the product of said oxidation with water to extract hydrogen peroxide thereby forming said aqueous hydrogen peroxide solution and recycling anthraquinone formed on said oxidation to effect said reduction, which comprises passing said aqueous hydrogen peroxide solution to a short cycle by contacting said solution with an anion exchange resin in the form of a salt of an acid weaker than acetic acid, regenerating the spent resin thus produced by contacting the resin with an aqueous solution of an alkali metal salt of an acid weaker than acetic acid, contacting the regenerated resin with further of said hydrogen peroxide solution, repeating said short cycle a plurality of times, and periodically effecting a long cycle by contacting the resin with an acid which is at least as strong as acetic acid, and thereafter regenerating the resin after said long cycle by contacting such resin with an aqueous solution of said alkali metal salt and repeating said short cycle.

2. The process of claim 1 wherein the resin is in the carbonate form.

3. The process of claim 1 wherein the alkali metal salt is an alkali metal carbonate.

References Cited by the Examiner

UNITED STATES PATENTS

| | | | |
|---|---|---|---|
| 2,485,485 | 10/1949 | Dudley | 210—37 |
| 2,658,042 | 11/1953 | Johnson | 210—37 |
| 2,772,237 | 11/1956 | Bauman et al. | 210—37 |
| 2,868,832 | 1/1959 | Taylor et al. | 210—37 |

FOREIGN PATENTS 190,904  7/1957  Austria.

OSCAR R. VERTIZ, *Primary Examiner.*

MAURICE A. BRINDISI, *Examiner.*

M. N. MELLER, O. CRUTCHFIELD,
*Assistant Examiners.*